Patented Sept. 15, 1936

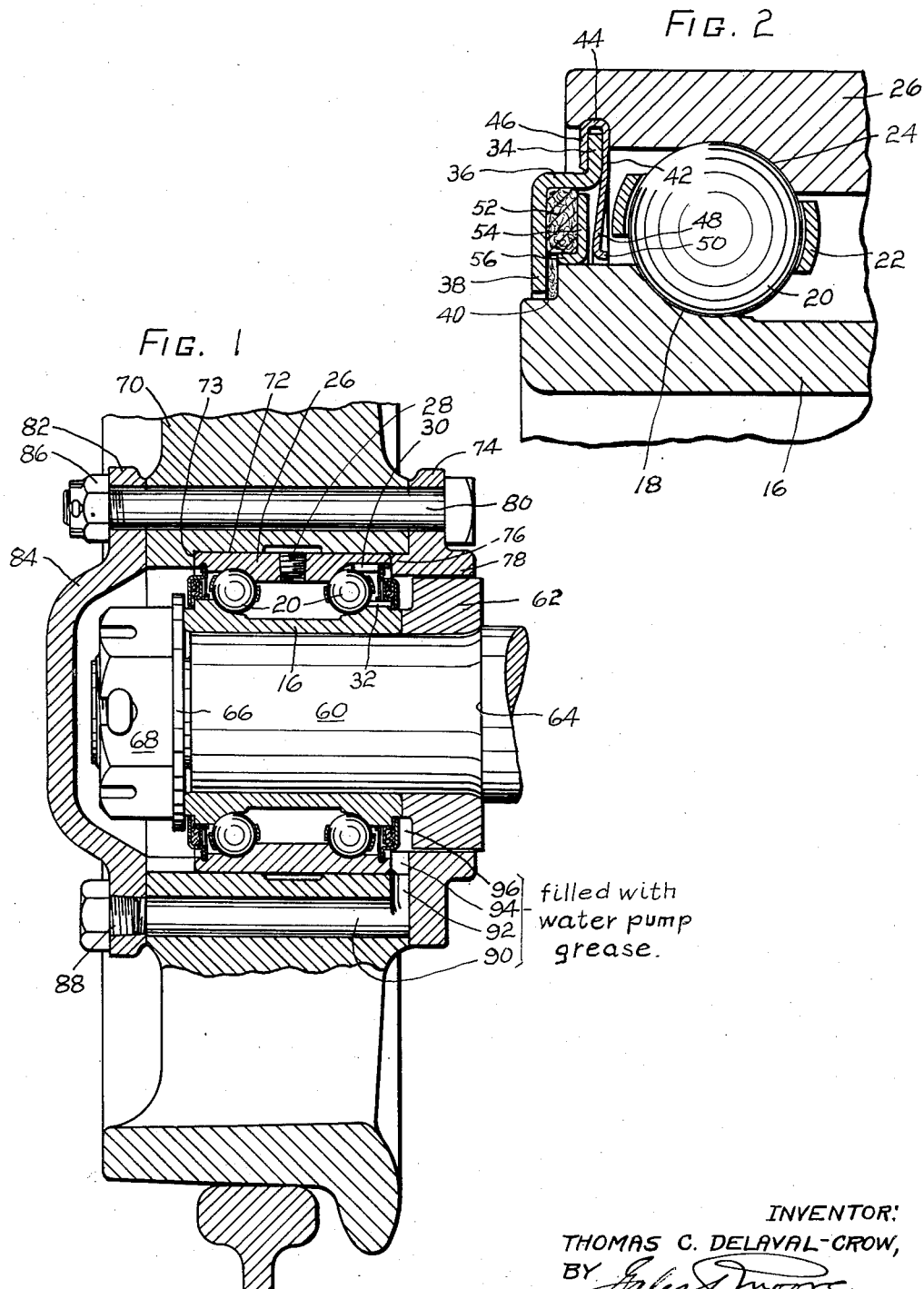

2,054,581

UNITED STATES PATENT OFFICE 2,054,581

BEARING AND MOUNTING

Thomas C. Delaval-Crow, Bristol, Conn., assignor to General Motors Corporation, Detroit, Mich., a corporation of Delaware Application October 1, 1934, Serial No. 746,404

3 Claims. (Cl. 308—187)

This invention relates to bearings and mountings and comprises all of the features of novelty herein disclosed. An object of the invention is to provide an improved bearing mounting for mine-car wheels and the like. Another object is to provide improved means for excluding foreign matter from an antifriction bearing and retaining lubricant therein. To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a sectional view through the axis of a wheel and its mounting.

Fig. 2 is a sectional view to large scale of a portion of a bearing.

The bearing comprises an inner race ring 16 having widely spaced, angular contact raceways 18 engaging two rows of rolling elements in the form of balls 20 having cages 22. The balls also engage co-operating raceways 24 of an outer race ring 26 and are put under a predetermined initial load in their assembly. The outer race ring has a central radial opening provided with a removable threaded plug 28 to provide for cleaning or filling with lubricant. The bearing is in all respects symmetrical about its vertical center except that, at one side, its race rings are provided with filling slots 30 and 32 to provide for assembly of the balls of one row.

Each side of the bearing is closed by a seal composed of co-operating washers. One washer is quite thick and comprises a peripheral flange 34, an axially extended cupped portion 36, and an inwardly extending side wall or flange 38, the latter extending along a side face of the inner race ring at one side of a peripheral notch 40. Another washer which is thinner is attached to the first and comprises a flat portion 42 engaging the flange 34, a rounded bead 44, and a terminal flap 46. In locking the washers together, the edge of the flap is pressed laterally along the cupped portion 36 against the flange 34 in order to expand the rounded bead 44 into a groove which is next to a shoulder of the outer race ring. Thus both washers are secured tightly to each other and to the race ring. The thinner washer also comprises a slightly inclined or dished side wall 48 which is spaced from the side wall 38 and terminates near the inner race ring in an inclined bend or flange 50. Within the cupped portion 36 is contained a packing ring or sealing washer 52, preferably of felt, which runs in the angle of an angle washer comprising a flat leg 54 and a cylindrical leg 56, the latter being pressed on the inner race ring and terminating near the inside wall of the notch 40. The leg 54 and the inclined wall 48 make an angle of approximately four degrees with one another, this angle having been found to produce a capillary attraction tending to hold lubricant between the race rings. The flange 50 is similarly inclined with respect to the race ring for the same reason.

In mounting, the bearing is slipped onto a shaft 60, such as the axle of a mine car, until the inner race ring abuts against a collar 62 which has been previously driven onto the axle against a shoulder 64 thereof. The inner race ring is then clamped by a washer 66 and a nut 68. A wheel hub 70 having a bearing seat 72 is then slipped over the bearing until a shoulder 73 at the end of the bearing seat engages the outer race ring. The shaft 60 and hub 70 are merely illustrative of a typical mounting for a pair of relatively rotatable members. The wheel and the bearing are secured together by an end closure plate or ring 74. The ring 74 has an axial projection or flange 76 fitting in the seat 72 either against or close to the outer race ring. The ring also has an extension 78 and is internally cylindrical to closely surround the axle collar 62. Clamping bolts 80 are passed through the ring 74, the wheel hub, and a flange 82 of an end cap 84, nuts 86 being threaded on the outer ends of the bolts.

The end cap has a threaded plug 88 which is removable in order that grease may be forced into a hole 90 of the hub, the hole leading to a radial port or passage 92 communicating with a radial port or passage 94 in the projection 76. The port 94 conducts the grease into an annular space provided by a notch 96 in the collar 62. The grease is preferably of thick consistency such as water pump grease which resists leakage of water between the collar 62 and the ring 74. This grease not only resists entrance of water but since it fills the space outside of the adjacent bearing seal, it also provides an additional seal against leakage of bearing lubricant.

The bearing is wide enough so that it can have an easy fit with the axle and with the hub without allowing tilting of those members. The bearing need not be clamped between the shoulder 73 and the projection 76 but the latter can clear the adjacent ring 26 thus permitting the ring 74 to clamp up tight against a finished face on the side of the hub and so making a gasket unnecessary. Removal of a worn wheel requires merely removal of the bolts and the end cap whereupon the wheel slips off the bearing easily, the bearing meanwhile being enirely sealed up and protected. Re-lubrication, if needed, is easily accomplished upon removal of the plug 28.

I claim:

1. In a device of the character described, a shaft, a hub, a bearing having its inner race ring on the shaft and its outer race ring in the hub, an abutment collar on the shaft and engaging one end of the inner race ring, a bearing retaining ring fastened to the hub and surrounding the collar, sealing means attached to the bearing adjacent to the collar and the ring, and a packing at the outside of the sealing means and closing the space between the collar and the ring; substantially as described.

2. In a device of the character described, a shaft, a hub, a bearing having its inner race ring on the shaft and its outer race ring in the hub, an abutment collar on the shaft and engaging one end of the inner race ring, a bearing retaining ring fastened to the hub and surrounding the collar, sealing means attached to the bearing to close the space between the race rings thereof, the collar having a peripheral notch to form an annular recess outside of the sealing means, and a packing in the recess; substantially as described.

3. In a device of the character described, a shaft, a hub, a bearing having its inner race ring on the shaft and its outer race ring in the hub, a sealing device attached to the bearing to close the space between the race rings, a ring secured to the hub and having a flange at one end of the outer race ring to hold the latter in the hub, means at the end of the inner race ring to form an annular recess alongside the sealing device, the ring flange having a port leading into the annular recess, and the hub having a passage leading to said port for introducing a packing medium into the annular recess alongside the sealing device; substantially as described.

THOMAS C. DELAVAL-CROW.